(12) United States Patent
Drees et al.

(10) Patent No.: US 6,652,403 B2
(45) Date of Patent: Nov. 25, 2003

(54) VARIATOR

(75) Inventors: Silvius Drees, Tettnang (DE); Jochen Fischer, Friedrichshafen (DE); Stefan-Ulrich Prange, Ravensburg (DE)

(73) Assignee: ZF Batavia, L.L.C., Batavia, OH (US)

( * ) Notice: Subject to any disclaimer, the term of this patent is extended or adjusted under 35 U.S.C. 154(b) by 23 days.

(21) Appl. No.: 10/020,042

(22) Filed: Dec. 13, 2001

(65) Prior Publication Data

US 2002/0077211 A1 Jun. 20, 2002

(30) Foreign Application Priority Data

Dec. 14, 2000  (DE) .......................... 100 62 463

(51) Int. Cl.$^7$ ................................ F16G 1/22
(52) U.S. Cl. ....................... 474/201; 474/242
(58) Field of Search ..................... 474/201, 242, 474/244, 245

(56) References Cited

U.S. PATENT DOCUMENTS

| | | | | |
|---|---|---|---|---|
| 3,949,621 A | * | 4/1976 | Beusink et al. | 474/201 |
| 4,631,042 A | * | 12/1986 | Rattunde | 474/242 |
| 4,692,985 A | * | 9/1987 | Van Dijk | 29/450 |
| 5,792,013 A | * | 8/1998 | Heinrich et al. | 474/242 |
| 6,416,433 B1 | * | 7/2002 | Linnenbrugger | 474/242 |

FOREIGN PATENT DOCUMENTS

| | | | |
|---|---|---|---|
| DE | 34 47 092 C2 | 6/1989 | F16H/9/12 |
| DE | 42 30 605 C1 | 8/1993 | F16H/9/24 |
| DE | 691 03 961 T2 | 4/1995 | F16G/5/16 |
| DE | 197 08 865 A1 | 10/1997 | F16H/9/24 |
| EP | 0 976 949 A1 | 2/2000 | F16G/5/16 |
| JP | 63053352 A | 3/1988 | F16H/9/12 |

OTHER PUBLICATIONS

Lechner, G. and H. Haunheimer, "Fahrzeugegetriebe" Springer–Verlag, Berlin, Germany, 1994, p. 332.

\* cited by examiner

*Primary Examiner*—Chong H. Kim
*Assistant Examiner*—Bradley J. Van Pelt
(74) *Attorney, Agent, or Firm*—Davis & Bujold, PLLC

(57) ABSTRACT

Within the scope of the method for compensating angular misalignments for the variator of a continuously variable belt-drive transmission having cone pulleys disposed in pairs and one pushing linked band as torque transmitting belt-drive element, the fixed cone pulley of a variator side is designed with a curved outline, a pushing link displacement path being calculated with reference to a crowned pushing link flank outline and then the pushing link displacement path to the other side of the variator is calculated so that the displacement path is free of angular misalignment.

6 Claims, 5 Drawing Sheets

VARIATOR

FIELD OF THE INVENTION

This invention concerns a variator of a continuously variable automatic transmission and in particular of a belt-drive transmission for motor vehicles.

BACKGROUND OF THE INVENTION

A continuously variable automatic transmission usually consists, among others, of a starting unit, a forward/reverse travel, an intermediate shaft, differential, hydraulic and electronic control devices and a variator. The variator, in turn, usually comprises one primary and one secondary variator. In a variator according to the belt-drive principle, the variator is designed with cone pulleys disposed in pairs and provided with a torque-transmitting belt-drive element which rotates between both pairs of cone pulleys. In such a transmission, an actual ratio go is defined by the running radius of the belt-drive element which results from the actual axial position of the cone pulleys.

The axially fixed cone pulleys, each associated with an input and output shaft, are diagonally opposite each other. According to the prior art, as the belt-drive element is mostly used a pushing linked band or a chain, the pushing linked band having the advantage of not developing much noise.

In the prior art, the outlines of the cone pulleys and the flanks of the pushing links or the flanks of the belt-drive element customarily have straight outlines. In DE 42 30 605 is described an example of a sprocket chain with straight outlines for continuously variable automatic transmissions. This already known chain consists of light, long, thick bolts and bearings having smooth, cylindrical surfaces and wedge-shaped, friction-resistant side surfaces with flattened medium marginal surfaces made of plastic material reinforced with fiber glass of high resistance to pressure or of steel pipe with lateral wedge bodies of plastic material, the same as of two wide, outer, flexible plastic bands reinforced with fiber glass with high tensile strength and two inner, wide, elastic, thin steel bands.

An example of a continuously variable automatic transmission according to the prior art having a pushing linked band with straight outlines in the contact zone pushing link element/cone pulley has been described in "G. Lechner and H. Naunheimer, Vehicle Transmissions, Springer Editing House 1994, page 332."

However, there have been proposed other arched, domed outlines, especially in order to avoid edge support during operation.

DE 197 08 865 A1 describes in this context a sprocket chain for a continuously variable automatic transmission, the joints of which that connect the individual links of the chain are designed as pairs of rocking members wherein the friction surfaces of the cone pulleys and the front faces of the rocking members have a crown oriented against each other and corresponding to the arched course. Departing from a front face line situated parallel to the moving direction and lying 1:1 substantially on the radial height of the ratio position, the other radially outwardly adjacent front face lines, which describe the spatially curved front face, increasingly deviate at their intersection point with the rocking surface in direction to the associated cone pulley so that an edge support of the front faces of the rocking members is avoided. But this principle is applicable only to the case of a chain, since a pushing linked band consists of a plurality of small thin metal plates loosely lined upon two steel ring sets without such connecting joints. In addition DE 197 08 865 A1 discloses no connection between curved front faces of rocking joints and an angular misalignment of the chain variator.

The geometry of the outlines of the cone pulleys and the pushing link flanks of the variators known at present results in a geometric angular misalignment of the belt-drive element for almost all ratio values.

Therefrom particularly results an additional bending component of the steel rings of the pushing linked band used which reduces the service life thereof.

Accordingly, the problem on which this invention is based is to indicate a method for deducing the outlines of the cone pulleys and pushing link flanks of a variator of a continuously variable belt-drive transmission having a pushing linked band as belt-drive element so as entirely to compensate the geometrically determined angular misalignment.

SUMMARY OF THE INVENTION

Accordingly, it is proposed to give to the fixed cone pulley of one side of the variator an arbitrarily curved outline, then to calculate via a crowned pushing link flank outline an appertaining pushing link displacement path and, knowing the displacement path, to deduce the pushing link displacement path to the other side of the variator so that the displacement path is free of angular misalignment.

The second cone pulley outline is then calculated via the already indicated crowned outline of the pushing link flank so that the outlines of the cone pulleys and pushing link flanks of the variator make possible an operation free of angular misalignment.

The pushing link flanks can be arbitrarily uniformly configured; this has the condition of sufficient angles of inclination on the upper and lower edges of the cone pulley outline.

It is obtained by the inventive method that the belt-drive element is operated for all ratios free of angular misalignment.

Besides, within the scope of the inventive method, the crown of the pushing link flanks is configured so that edge support of the pushing linked band is eliminated, according to the invention, the angle of inclination the upper edge of the pushing link flank is steeper than the angle of inclination on the contact point in the position of the variator OD on the primary side or LOW on the secondary side. In addition, the angle of inclination on the lower edge of the pushing link flank is flatter than the angle of inclination on the contact point in the position of the variator LOW on the primary side or OD on the secondary side. The distance between the uppermost contact point and the upper edge of the pushing link or the lowermost contact point and the lower edge of the pushing link is selected here so that the flattenings do not extend over the pushing link edges due to Hertz compression.

Between the limit contact points, the pushing link flanks can arbitrarily be uniformly configured. This procedure results in clear and calculable contact ratios without edge supports.

According to the invention, drainage data compulsory in crowned pushing link flanks are eliminated, since the compressions resulting from the crowned contact surface of the suction link elements are eliminated in the disk-contact element to the extent that it poses no problem to penetrate through the elastohydrodynamic oil film in order to prevent slipping.

It is possible, according to the invention, to take into account deformations of the parts so as to prevent, according to a characteristic field composed of torque and/or load cycle, the axial components of the deformation and the angular misalignment resulting therefrom.

The inventive method can be implemented in the production of the cone pulleys and pushing link elements without considerable extra expenditure. By using the method of substantially increased life service of the pushing linked band is additionally obtained.

The inventive construction generates increased compressions in the contact pushing link element/disk. But the compressions have less contact surfaces than in straight contact outlines so that the contact area is surrounded throughout its periphery by pushing link material, is supported on all sides and can deform without exceeding the admissible pressure widths.

BRIEF DESCRIPTION OF THE DRAWINGS

The invention is explained in detail herebelow with reference to the drawings which shows.

DETAILED DESCRIPTION OF THE INVENTION

Figure 1:
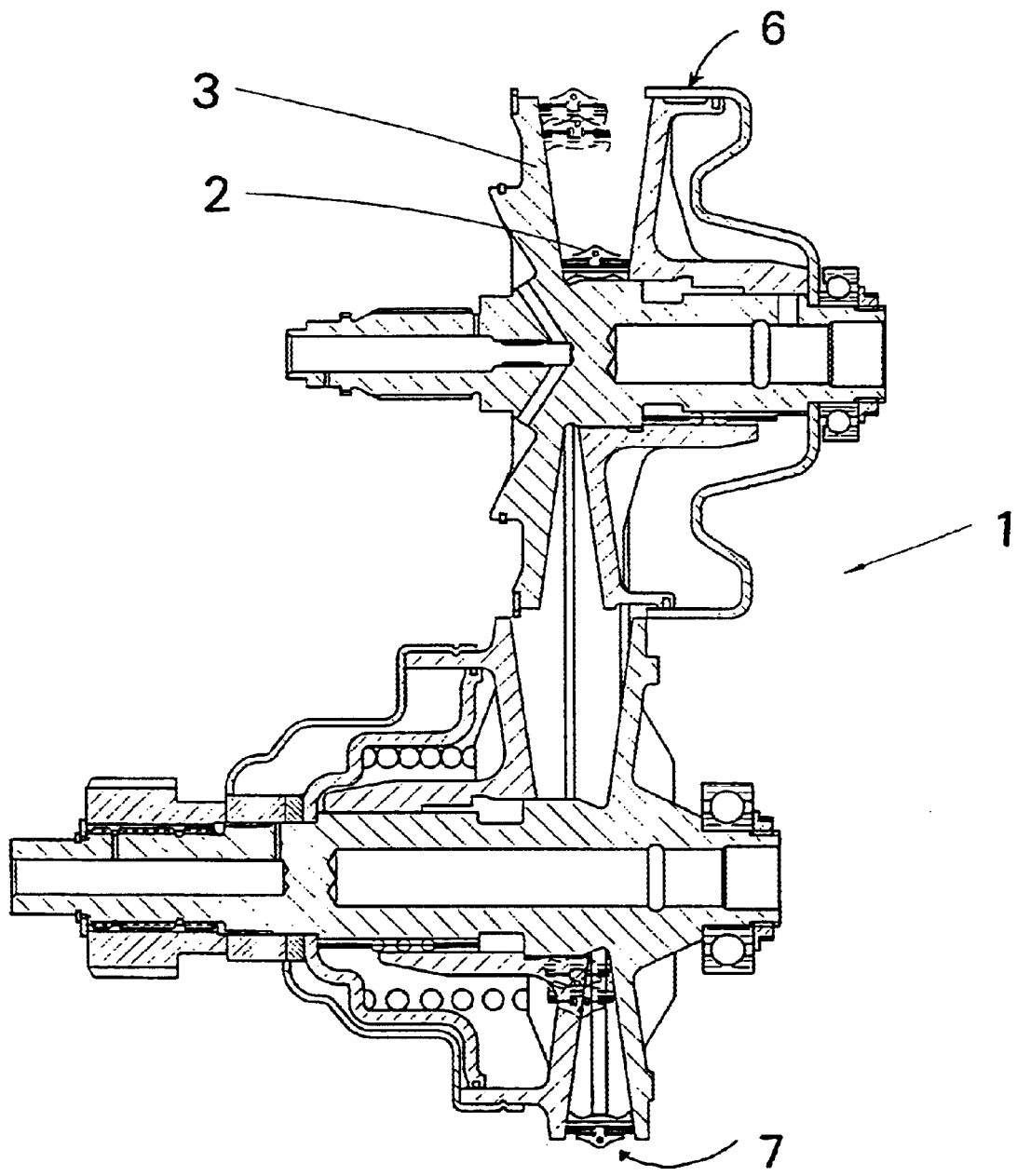
FIG. 1 is a continuously variable belt-drive transmission with straight outlines of the variator according to the prior art.

According to FIG. 1, the core of the continuously variable automatic transmission 1 comprises a pushing linked band 2 which rotates between two axially adjustable cone pulleys 6,7.

Figure 2:
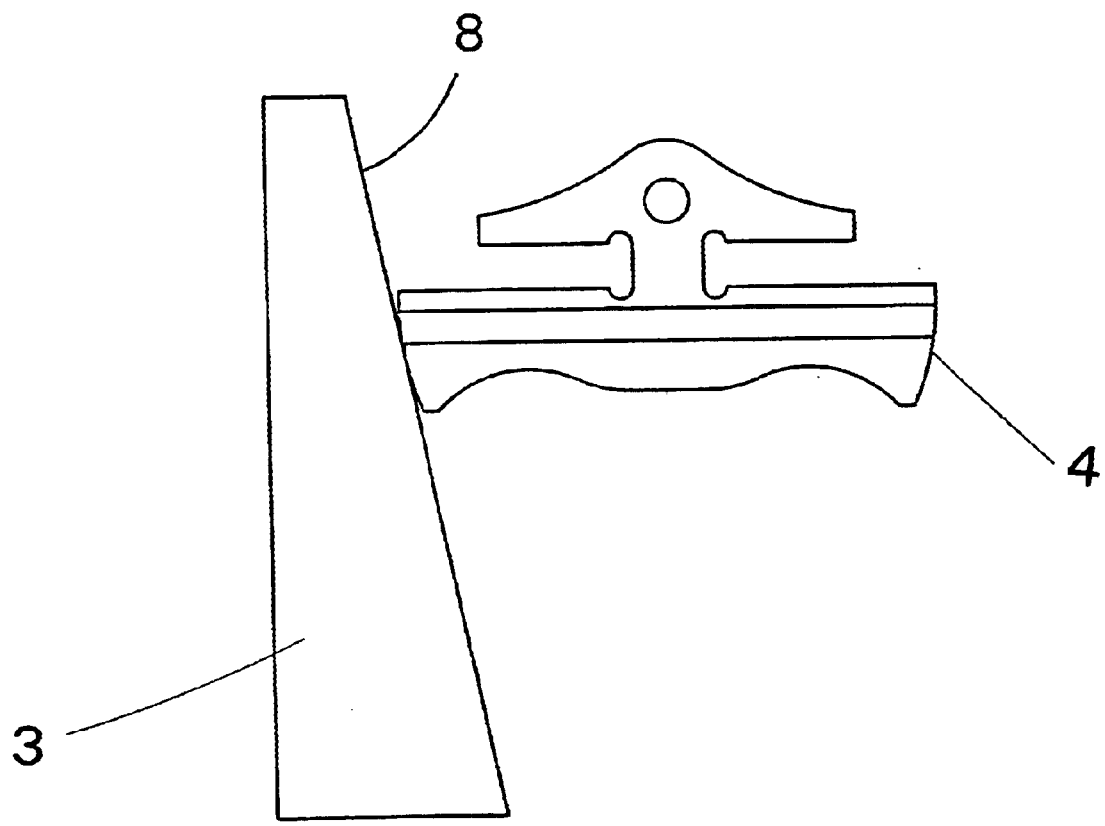
FIG. 2 is a simplified representation of the primary fixed cone pulley of FIG. 1, but with crowned outlines of the cone pulley and curved pushing link flanks according to the invention.

FIG. 2 shows a simplified representation of the primary fixed cone pulley 3 of FIG. 1 which, according to the invention, has a crowned cone pulley outline 8. In FIG. 2 are also shown the inventive curved pushing link flanks 4.

The pushing link flanks 4 are arbitrarily configured, according to the invention, monotonously uniformly when sufficient angles of inclination are provided on the upper and lower edges 23, 27 of the pushing link flanks 4, the crown of the pushing link flanks being configured so that edge support is eliminated.

Figure 3:
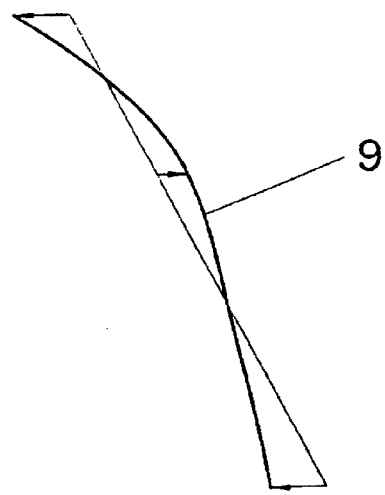
FIG. 3 is an illustration of deducing a pushing link displacement path free of angular misalignment from a straight pushing link displacement path with angular misalignment.
Figure 4:
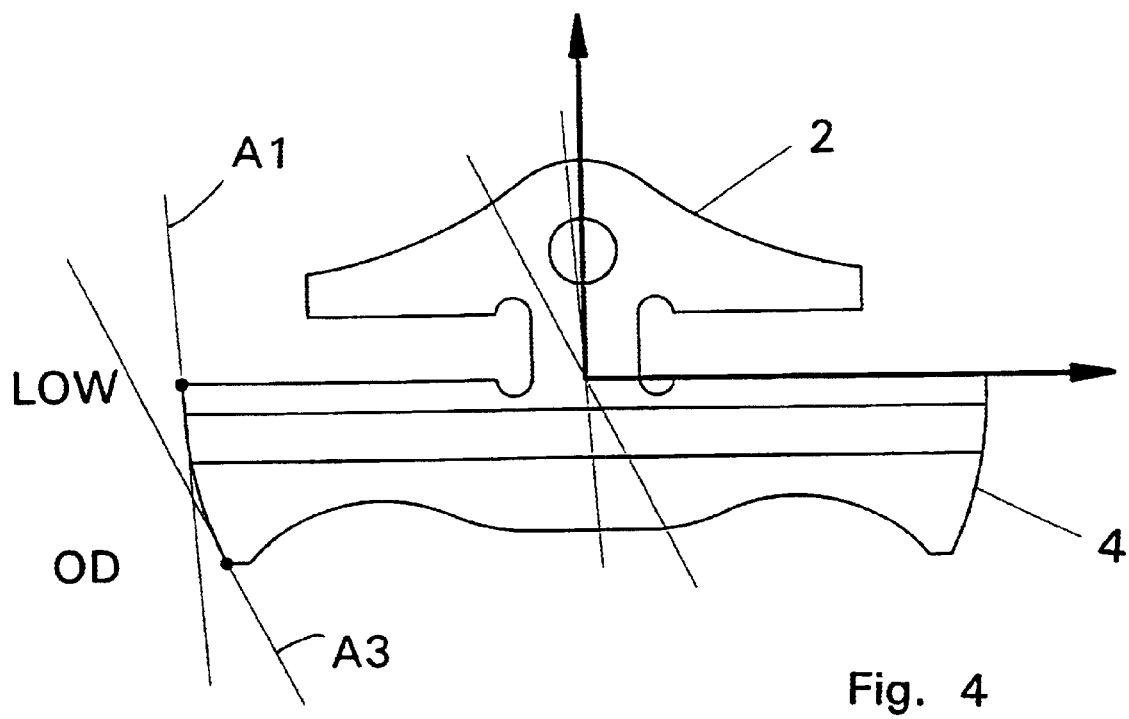
FIG. 4 is an illustration of the minimum and maximum lead angles of the pushing link flanks.

In FIG. 3 is shown a pushing link displacement path 9 (thick line) free of angular misalignment which is deduced from a pushing link displacement path with misalignment along a straight cone pulley outline according to the prior art.

The calculation of the pushing link displacement path 9 free of angular misalignment comprises, according to the invention, the following steps:

An adequate crowned cone pulley outline 8 for the first cone pulley pair and an adequate crowned pushing link outline 4 are first selected. The distance between the uppermost contact point 21 and the pushing link upper edge 23 or lowermost contact point 25 and pushing link lower edge 27 is selected so that flattenings due to Hertz compression do not extend over the pushing link edges 23, 27. Then the pushing link displacement path is determined by calculating for all running radii the tangential contact point between the pushing link flank 4 and the first fixed cone pulley 3.

The pushing link displacement path to the second cone pulley pair 7 is determined for all running radii by assuming the axial pushing link position from the pushing link displacement path to the first cone pulley pair and then calculating the appertaining running radius from the respective radius of the pushing link displacement path to the first cone pulley pair.

The outline of the second cone pulley pair 7 is then determined for all running radii by calculating the tangential contact point between pushing link flank 9 and the second fixed cone pulley 7 as follows: first is calculated the tangent on the pushing link displacement path 9 to the second cone pulley pair 7 and then the point on the pushing link flank with the same tangent. As a last step is tested whether upon the second cone pulley pair 7 a sufficient distance from the uppermost and lowermost contact points 21, 25 of the pushing link edges has been maintained.

According to the invention, the angle of inclination A1 on the upper edge 23 of the pushing link flank 4 is here steeper than the angle of inclination A2 on the contact point in the variator position OD on the primary side, or LOW on the secondary side. Besides, the angle of inclination A3 on the lower edge 27 of the pushing link flank is flatter than the angle of inclination A2 on the contact point in the variator position LOW on the primary side, or OD on the secondary side. The distance between uppermost contact point 21 and pushing link upper edge 23 or lowermost contact point 25 and pushing link lower edge is selected here so that the flattening due to Hertz compression does not extend beyond the pushing link flanks 4.

Between the limiting contact positions, the pushing link flank 4 can be arbitrarily configured monotonously uniform. This connection is diagrammatically illustrated in FIG. 5 where for clarification a straight pushing link flank, as shown from the prior art, is plotted shaded.

Figure 5:
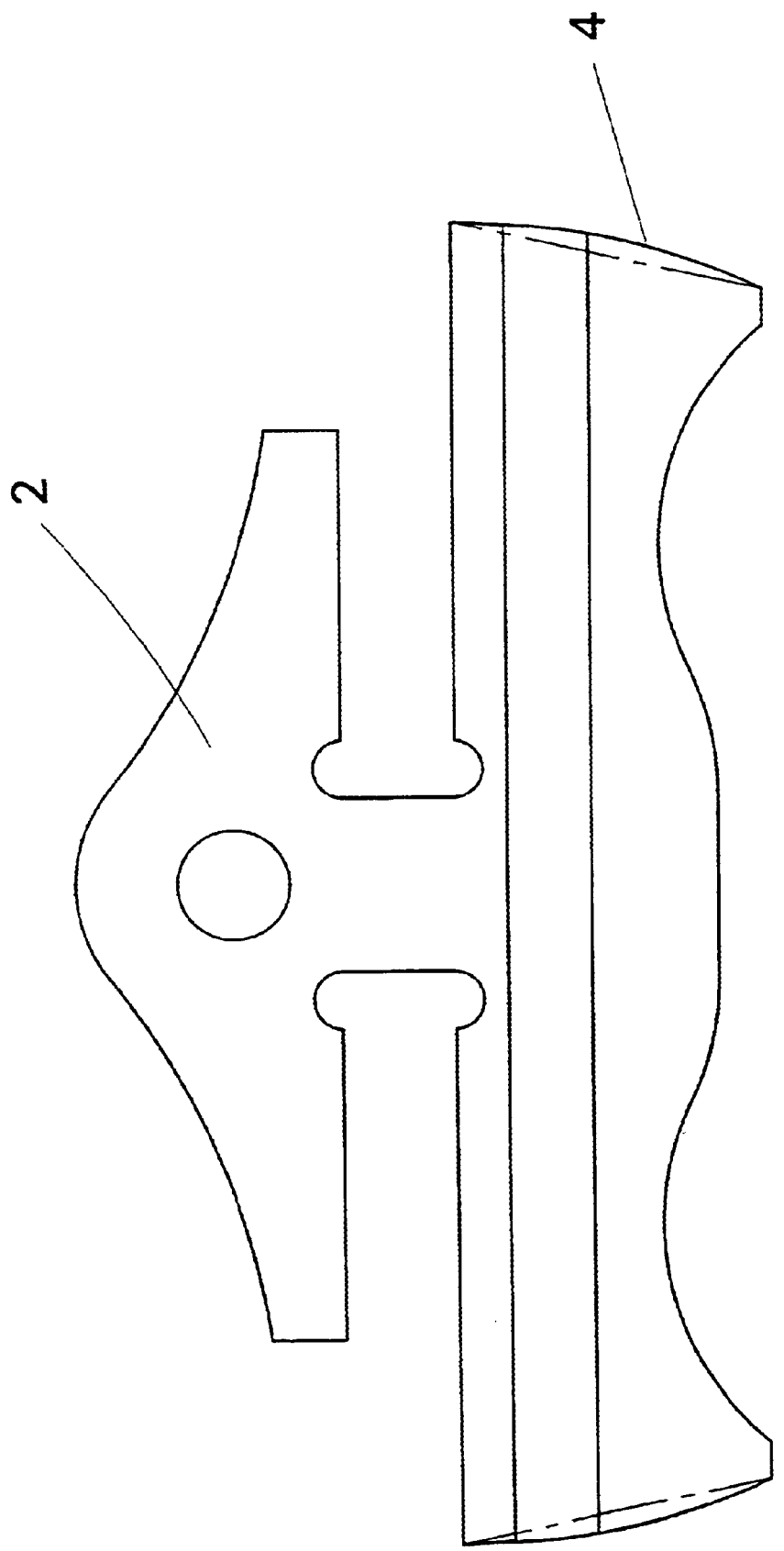
FIG. 5 is a pushing link with crown of the pushing link flank.
Figure 6:
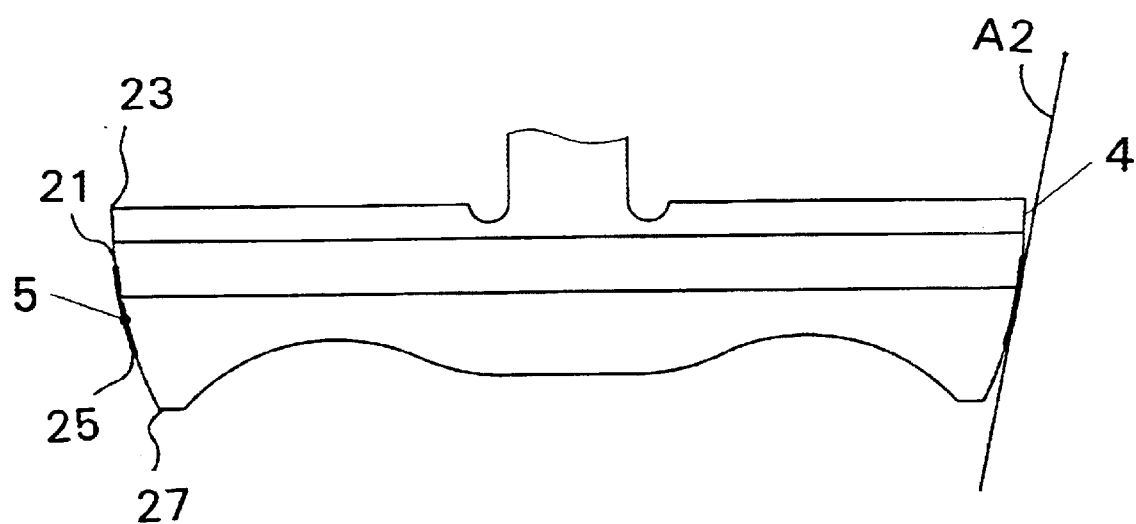
FIG. 6 is the contact areas on the pushing link flanks.

An inventively designed pushing link of the pushing linked band 2 is shown in FIG. 5. Contrary to the prior art, the pushing link flanks have no straight outlines. The curved contact areas 5 between pushing link flank and cone pulley are shown in detail in FIG. 6.

What is claimed is:

1. A method for compensating for angular misalignments for a variator of a continuously variable belt-drive transmission having a first cone pulley pair and a second cone pulley pair connected by a pushing linked band as a torque-transmitting element, the method comprising the following steps:

selecting a curved outline of a first fixed cone pulley of the first cone pulley pair on a primary side of the variator;

selecting a crowned pushing link flank outline of the pushing link band calculating a first displacement path of the pushing link band relative to the curved outline of the first fixed cone pulley and the crowned pushing link flank outline for all running radii of the pushing linked band about the first come pulley pair;

assuming a compensating displacement path of the pushing link band for the second pair of cone pulleys relative to the known first displacement path to eliminate any angular misalignment of the pushing link band; and calculating an outline of the second pair of cone pulleys based on the compensating displacement path and the pushing link flank outline to ensure the pushing link band conforms to the compensating displacement path for the second pulley and eliminates angular misalignment of the pushing link band.

2. The method according to claim 1, further comprising the step of arbitrarily configuring said pushing link flanks uniformly according to tangent lines between the pushing link flanks and an upper and lower edges of the cone pulley outline.

3. The method according to claim 1, further comprising the step of defining the pushing flank outline having an angle of inclination of an upper edge of the pushing link flank being steeper than an angle of inclination of a contact point of the pushing flank outline with the curved outline of the first fixed cone pulley, and an angle of inclination of a lower edge of the pushing link flank outline being flatter relative to the angle of inclination of the contact point.

4. The method according to claim 1, further comprising the step of preventing axial components of the angular misalignment by accounting for deformation of parts according to a characteristic field of at least one of torque and load cycle.

5. A method for determining outlines for a first cone pulley and a second cone pulley, and an outline for pushing link flanks of a pushing link band connecting the first and second cone pulleys in a variator of a continuously variable transmission, the method comprising the following steps:

providing the first cone pulley with a known outline and also providing the pushing link flanks with a known pushing link flank outline;

determining a displacement path of the pushing link band on the first cone pulley according to the known first pulley outline and the known pushing link flank outline for a plurality of running radii of the pushing link band about the first cone pulley pair;

determining a compensating displacement path of the pushing link band for the second cone pulley based on the first displacement path to eliminate any angular misalignment of the pushing link band; and calculating an outline of the second cone pulley based on the known pushing link flank outline and the compensating displacement path to ensure the pushing link band conforms to the compensating displacement path for the second cone pulley and provide for elimination of the angular misalignment of the pushing link band.

6. The method according to claim 5 further comprising the step of determining the displacement path of the pushing link band on the first cone pulley by calculating for each of the plurality of running radii a tangential contact point between the pushing link flank outline and the first cone pulley outline.

* * * * *